Figure 1:
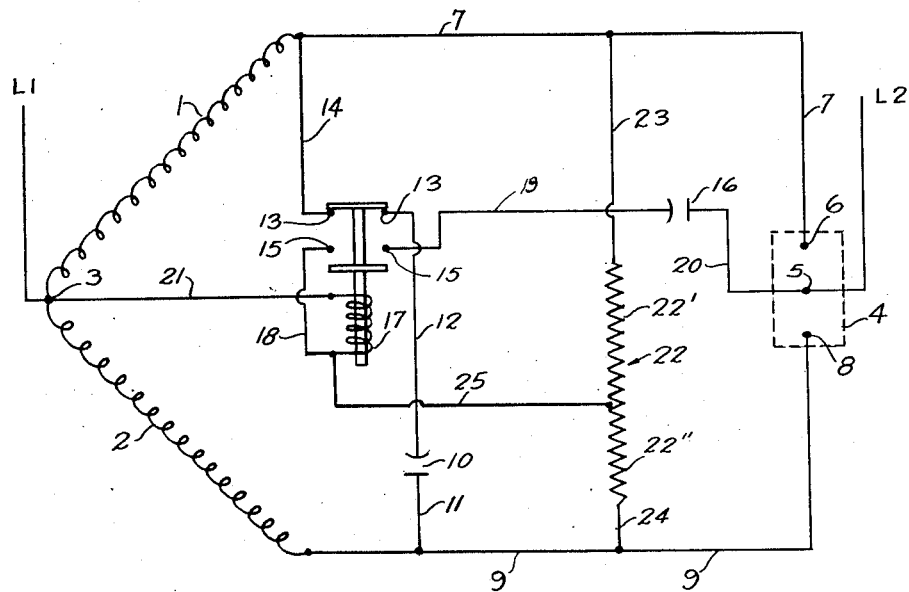

June 23, 1953   L. D. CLARK   2,643,357
INSTANTLY REVERSIBLE MOTOR
Filed Dec. 28, 1950

Loris D. Clark
INVENTOR

Tom Walker
ATTORNEY

Patented June 23, 1953

2,643,357

UNITED STATES PATENT OFFICE 2,643,357

INSTANTLY REVERSIBLE MOTOR

Loris D. Clark, Dayton, Ohio, assignor to The Master Electric Company, Dayton, Ohio, a corporation of Ohio Application December 28, 1950, Serial No. 203,173

8 Claims. (Cl. 318—207)

This invention relates to electric motors, and more particularly to an instantly reversible electric motor of the capacitor or condenser type.

Most of such motors include a relay or a centrifugal switch, or a combination of both in addition to resistors and the like. These elements have been connected in various circuits, all of which have certain disadvantages. In some circuits involving a relay for control, the relay is so located in relation to the motor connections that it will not immediately respond to an opening of the power line, thus an instantly reversible motor is impossible. Other circuits have provided for de-energization of the relay upon opening of the power line, but have failed to provide means making the control circuit responsive to motor speed should the motor be overloaded resulting in a decrease in motor speed. Other circuits involving centrifugal switches have had various weaknesses which prevented them from being a satisfactory and efficient instantly reversible motor control.

The present circuit has been developed in an effort to obviate such disadvantages and to provide an instantly reversible motor which is also responsive to fluctuations in motor speed.

The object of the invention is to simplify the construction as well as the means and mode of operation of instantly reversible motors of the type described, whereby such devices may not only be economically manufactured, but will be more efficient and practical in use, adaptable to a wide range of applications, having relatively few parts, and be unlikely to get out of repair.

A further object of the invention is to provide a control circuit for an instantly reversible motor which may be operated with a single pole double throw switch.

A further object of the invention is to provide a control circuit for an instantly reversible motor which is responsive to variations in potential within the motor.

A further object of the invention is to provide such a control circuit without the need for special coils built into the motor.

A further object of the invention is to provide such a control circuit eliminating the need for high voltage condensers and the possibility of overheating thereof.

A further object of the invention is to provide an instantly reversible motor possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Figure 2:
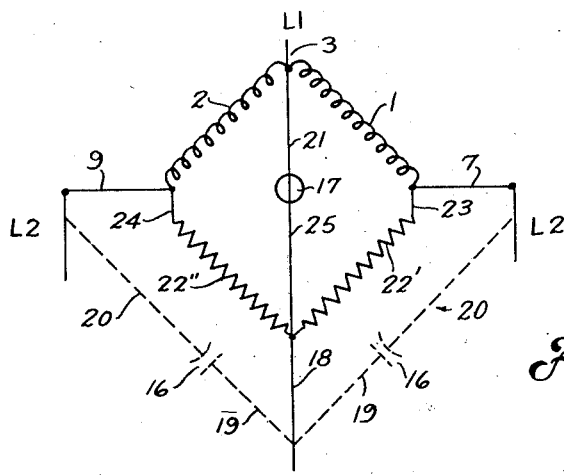

Referring to the drawing, wherein is found the preferred but obviously not necessarily the only form of embodiment of the invention, Fig. 1 is a wiring diagram for an instantly reversible motor embodying the instant invention, and Fig. 2 is a diagrammatic showing of the fundamental control circuit embodied in the instant invention.

Like parts are indicated by similar characters of reference throughout the several views.

Referring to the drawing, the motor to be controlled, a conventional motor of either two phase distributed winding or concentric pole construction, is diagrammatically shown by windings 1 and 2. Although not necessary for the proper functioning of the present control circuit, the windings 1 and 2 are preferably substantially identical in electrical respects so that motor performance will be the same in both directions of rotation. Single phase current is supplied thereto through power lines $L_1$ and $L_2$, line $L_3$ being connected to the common point 3 intermediate the windings 1 and 2 while line $L_2$ is selectively connected to the opposite end of either winding 1 or 2 through a single pole double throw switch 4. As shown, power line $L_2$ is connected to the center contact 5 of the switch, and if it is desired to energize winding 1, the switch is closed to contact 6 from which the power is conducted to winding 1 through conductor 7. To energize the motor in the opposite direction of rotation, winding 2 is energized by closing the switch to contact 8 from which power is conducted to the winding 2 through conductor 9.

The motor is of the capacitor-start type in which a condenser 10 is connected across the open ends of windings 1 and 2 through conductors 11, 12 normally closed relay contacts 13 and conductor 14. When winding 1 is energized by closing contacts 5—6 in power line $L_2$, winding 1 becomes the main winding and winding 2 with condenser 10 in series therewith becomes the starting winding which is connected across the ends of winding 1 parallel thereto. Upon closing contacts 5—8 winding 2 becomes the main winding while winding 1 becomes the starting winding with condenser 10 in series therewith.

Upon the motor reaching running speed in either direction of rotation (the direction of rotation depending upon whether winding 1 or 2 is the main winding) the normally closed relay contacts 13 are opened thereby removing the starting winding and condenser 10 from the main power circuit. Simultaneously with the opening of the normally closed relay contacts 13, normally open relay contacts 15 are closed thereby putting condenser 16 in series with relay coil 17 through conductors 18 and 19, the opposite end of the condenser being permanently connected to power line $L_2$ at contact 5 through conductor 20. The opposite end of relay coil 17 is permanently connected to the common point 3 intermediate motor windings 1 and 2. The purpose of condenser 16 and its function will later become apparent.

The relay unit containing the double pair of contacts 13—15 and the coil 17 is a potential relay, the coil 17 responding to changes in potential applied thereto to thereby actuate the relay contacts from a "starting" to a "running" position, and vice versa.

To control energization of relay coil 17 a simple bridge circuit is formed by the addition of a resistor 22 having a center tap dividing the resistor into two portions 22' and 22" which function in connection with motor windings 1 and 2 respectively. (See Fig. 2.) The resistor 22 is connected across the open ends of windings 1 and 2 by conductors 23 and 24 while the center tap of resistor 22 is connected through conductor 25 to the side of relay coil 17 opposite that to which conductor 21 is connected. It will be noted that conductors 25 and 18 are connected to the same side of relay coil 17 which places condenser 16 in parallel with either resistor 22' or resistor 22" depending upon the position of control switch 4.

The bridge circuit thus formed comprises the motor windings 1 and 2 and the resistors 22' and 22" as the four arms thereof, with the relay coil 17 connected between the center tap of the resistor 22 and the center or common tap 3 of the two motor windings through conductors 25 and 21, respectively.

Such bridge circuit is at all times slightly unbalanced except when power is disconnected from both motor windings 1 and 2. With no power applied to either motor winding the bridge is balanced with or without the starting condenser 10 in the circuit and the potential across the relay coil 17 falls to zero. Under such conditions, the relay assumes its normal or "starting" position with contacts 13 closed to place the starting condenser 10 in circuit ready for a "starting" operation upon application of power to either motor winding 1 or 2.

Auxiliary condenser 16 serves to further unbalance the bridge circuit and to increase the potential across relay coil 17 during normal "running" operation of the motor. In addition, condenser 16 serves as a reference point for sensing the correct rotation for the particular motor winding energized. When power is switched from winding 1 to winding 2 with the starting circuit open ("running" operation) condenser 16 is effectively transferred from a parallel connection with resistor 22' to a parallel connection with resistor 22". Under such conditions the condenser 16 serves as a common point for the vector addition of the voltages in other parts of the bridge circuit.

To start the motor in one direction, power is applied to winding 1 by closing contacts 5—6 of switch 4, the relay being de-energized and starting condenser 10 in the circuit. Under this starting condition winding 2 becomes the phase winding and upon starting the motor the total induced potential applied to relay coil 17 is insufficient to actuate the relay. As the rotational speed increases the voltage generated in phase winding 2 increases sufficiently to provide sufficient induced voltage across relay coil 17 to actuate the relay. Thus, the starting circuit containing condenser 10 is opened at a motor speed corresponding to the normal operating or "cutout" speed of the motor as would be the case if a conventional centrifugal switch were used to open the starting circuit.

Operation of the relay to open the "starting" circuit closes the auxiliary control circuit containing auxiliary condenser 16 so that condenser 16 may function as a reference point for sensing the correct rotation of the motor in relation to the particular motor winding which is energized. During normal "running" operation of the motor in the "correct" direction when winding 1 is energized, the generated voltage in the phase winding 2 lags behind the line voltage in winding 1 by approximately 90°. At the instant power is switched from winding 1 to winding 2 to reverse the motor there is a 180° phase shift in the rotor flux and the generated voltage in winding 1 which is now the phase winding leads the line voltage by approximately 90°. Such change in the bridge circuit reduces the effective potential applied across relay coil 17 to a point where the relay is de-energized to thereby reclose the starting circuit through contacts 13 and open the auxiliary control circuit through contacts 15.

During this interval the motor has been running in the "wrong" direction relative to the particular motor winding which is now energized. But upon de-energization of the relay, the starting circuit is again placed in condition for normal operation and the former rotation of the motor has been arrested by a dynamic braking effect of the rotor flux. Substantially coincident with the de-energization of the relay the motor starts to rotate in the opposite direction which is the "correct" rotation for the particular motor winding then energized, namely winding 2. Upon the motor reaching normal "running" speed in this direction of rotation the relay is again energized as before to remove the starting condenser 10 from the circuit, and motor operation is again normal in the opposite direction.

The same sequence of events takes place in again reversing the motor by switching the power from winding 2 to winding 1.

With the common reference point established by auxiliary condenser 16 and the line voltage substantially constant, it will be appreciated that the phase shift in rotor flux and the resultant change in phase relation between the windings caused by switching power from one winding to the other, or a change in rotor speed, produces variations in the voltage generated in the phase winding and alters the degree of unbalance in the controlling bridge circuit. Such sources of voltage variation cause the relay to operate, first, as a switch to remove or insert the condenser 10 (the starting circuit) at a voltage corresponding to a predetermined motor speed, and second, as a switch to reclose the starting circuit to force reversal of motor rotation when power is switched from winding 1 to winding 2, or vice versa.

The normally open contacts 15 on the relay may be omitted and condenser 16 permanently connected to the center tap of resistor 22 if the constant current drain of condenser 16 (less than two watts at 115 volts) is not objectionable. Permanent connection of condenser 16 in such manner results in a cost reduction and somewhat better overall motor performance.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a reversible motor of the capacitor type having a pair of motor windings, a power line receiving said windings in parallel relation to one another, a single power double throw switch in said power line selectively connecting either of said windings directly across said line, a starting circuit including a normally closed switch connected between the ends of said windings and placing one winding in series relationship therewith when the other winding is directly connected across the line, a control circuit for said starting circuit including an electrically energized switch actuator, said control circuit comprising a simple bridge circuit including the two motor windings and a pair of resistors as the four arms thereof, the switch actuator being connected therein in such manner as to be responsive to the effective voltage across said bridge circuit, a condenser intermediate a power line and the center tap of said resistors connected in parallel with first one and then the other of said resistors depending upon the direction of rotation of the motor, and a normally open switch in said condenser circuit controlled by energization of the switch actuator, the construction and arrangement being such that the switch actuator is energized and de-energized by a change of potential within the bridge circuit responsive to fluctuations in motor speed or a change in phase relation of the two motor windings.

2. In a reversible motor of the capacitor type having first and second windings, a power line in which said windings are received in parallel relation to one another, a starting circuit connected between one end of each winding including a normally closed switch and a phase shifting member, a single pole double throw control switch in said power line selectively interconnecting either of the windings directly across the line and the other of said windings across the line in series with the starting circuit, a pair of resistors connected between one end of each of the first and second windings, an electromagnetic actuator for the normally closed switch connected in parallel with the first winding and one of said resistors and in parallel with the second winding and the other of said resistors, the construction and arrangement being such that the actuator is responsive to the effective voltage generated within the motor, such effective voltage varying in response to variations in motor speed to thereby open said normally closed switch upon the motor attaining normal running speed, a direction of rotation determining circuit comprising a condenser connected between a source of power and a point intermediate the two resistors, a normally open switch therein responsive to operation of the electromagnetic actuator to close said switch upon the motor attaining normal running speed, the construction and arrangement being such that the rotation determining circuit is placed in parallel with one or the other of said resistors to the exclusion of the other depending upon the position of the single pole double throw control switch.

3. A control circuit for an instantly reversible electric motor of the capacitor type having a pair of motor windings, a power line receiving said windings in parallel relation to one another, means for selectively connecting said windings in the line to serve alternatively as main and phase windings, including a single pole double throw control switch, a bridge circuit comprising the two motor windings and a pair of resistors subject to varying degrees of unbalance in relation to variations in motor speed and the phase relation of the motor windings, means for further unbalancing the circuit and determining the proper direction of rotation for the position of the control switch, and an electromagnetic actuator for a starting circuit, said actuator operating in response to variations of unbalance in the bridge circuit.

4. A control circuit for an instantly reversible electric motor of the capacitor type having a pair of motor windings, a power line receiving said primary windings in parallel relation to one another, means for selectively connecting said windings in the line to serve alternatively as main and phase windings, a normally balanced simple bridge circuit comprising the two motor windings and a pair of resistors as the arms thereof and an electromagnetic actuator for a starting circuit as the bridge, means for unbalancing the bridge circuit in response to variations in motor speed, the starting circuit actuator operating in response to a predetermined degree of unbalance, additional means for further unbalancing the bridge circuit subsequently to operation of the actuator comprising a condenser connected in parallel with one or the other of said resistors, and a control switch operation of which duofunctionally determines the direction of operation of the motor and switches the condenser from one resistor to the other to immediately affect the degree of unbalance in the bridge circuit causing instantaneous operation of the starting circuit actuator.

5. A control circuit for an instantly reversible motor of the capacitor type having a pair of windings, serving alternatively as main and phase windings, including a normally balanced simple bridge circuit comprising the two motor windings and a pair of resistors as the arms thereof and an electromagnetic actuator for a starting circuit as the bridge, means for unbalancing the bridge circuit in response to variations in motor speed, the starting circuit actuator operating in response to a predetermined degree of unbalance, supplemental means for affecting variations in the degree of unbalance in the bridge circuit comprising a condenser connected in parallel with one or the other of said resistors, and a control switch operation of which instantaneously alters the phase relation between said motor windings and the degree of unbalance in the bridge circuit to thereby operate the starting circuit actuator.

6. A control circuit for an instantly reversible motor of the capacitor type having a pair of windings serving alternatively as main and phase windings, and a starting circuit de-energized upon the motor reaching normal operating speed, including a pair of resistors, a relay coil, energization of which opens and closes the starting circuit, said resistors, relay coil and a pair of motor windings being connected in a normally balanced bridge circuit wherein the relay coil is de-energized, and means for unbalancing the bridge circuit to thereby energize the relay coil including means for energizing the motor windings to produce a variable degree of unbalance in the bridge circuit dependent upon the speed of the motor, and supplemental means for unbalancing the bridge circuit dependent upon a shift in phase of the two motor windings, the relay coil being energized by a predetermined degree of unbalance in the bridge circuit.

7. A control circuit for an instantly reversible motor of the capacitor type having a pair of windings serving alternatively as main and phase windings, and a starting circuit de-energized upon the motor reaching normal operating speed, including a relay coil, energization of which opens and closes the starting circuit, means for energizing the relay coil comprising a bridge circuit subject to varying degrees of unbalance, the coil being energized by a predetermined degree of unbalance in the bridge circuit, and means for unbalancing the bridge circuit including means for energizing and controlling the phase relation of said motor windings, the degree of unbalance being dependent upon motor speed and phase relation established in the windings.

8. A control circuit for an instantly reversible motor of the capacitor type having a pair of windings serving alternatively as main and phase windings, and a starting circuit de-energized upon the motor reaching normal operating speed, including a single pole double throw switch controlling energization of said motor windings and the phase relation thereof, a bridge circuit including potential responsive actuator for the starting circuit and means for varying the potential in said bridge circuit including the potential developed by the phase winding of the motor and the shift in phase relation of said windings, the actuator being energized and de-energized at a predetermined potential in said bridge circuit.

LORIS D. CLARK.

No references cited.